(12) United States Patent
Harris et al.

(10) Patent No.: US 8,756,500 B2
(45) Date of Patent: Jun. 17, 2014

(54) DYNAMIC CONTENT FEED FILTERING

(75) Inventors: Andrew W. Harris, Cambridge, MA (US); Erin M. O'Connell, Amesbury, MA (US); Hayley Lynn Steplyk, Salem, MA (US)

(73) Assignee: Microsoft Corporation, Redmond, WA (US)

( * ) Notice: Subject to any disclaimer, the term of this patent is extended or adjusted under 35 U.S.C. 154(b) by 210 days.

(21) Appl. No.: 13/237,231

(22) Filed: Sep. 20, 2011

(65) Prior Publication Data

US 2013/0073989 A1    Mar. 21, 2013

(51) Int. Cl.
*G06F 17/00*    (2006.01)

(52) U.S. Cl.
USPC .......................................... 715/273; 715/200

(58) Field of Classification Search
USPC ........................................ 715/200, 205, 273
See application file for complete search history.

(56) References Cited

U.S. PATENT DOCUMENTS

| | | | | |
|---|---|---|---|---|
| 5,581,686 | A * | 12/1996 | Koppolu et al. | 715/784 |
| 7,512,894 | B1 * | 3/2009 | Hintermeister et al. | 715/771 |
| 7,523,397 | B2 * | 4/2009 | Cheung et al. | 715/710 |
| 7,865,511 | B2 * | 1/2011 | Kahn et al. | 707/758 |
| 7,900,131 | B2 * | 3/2011 | Kahn et al. | 715/205 |
| 7,925,201 | B2 * | 4/2011 | Irvin et al. | 455/3.01 |
| 8,001,089 | B2 * | 8/2011 | Tabellion et al. | 707/674 |
| 8,082,272 | B2 * | 12/2011 | Fields et al. | 707/781 |
| 8,136,027 | B2 * | 3/2012 | Underwood et al. | 715/202 |
| 8,161,081 | B2 * | 4/2012 | Kaufman et al. | 707/802 |
| 8,510,137 | B2 * | 8/2013 | Bonev et al. | 705/5 |
| 2004/0225648 | A1 * | 11/2004 | Ransom et al. | 707/3 |
| 2006/0136830 | A1 * | 6/2006 | Martlage et al. | 715/745 |
| 2007/0083894 | A1 | 4/2007 | Gonsalves et al. | |
| 2008/0306959 | A1 * | 12/2008 | Spivack et al. | 707/9 |
| 2009/0164904 | A1 | 6/2009 | Horowitz et al. | |
| 2010/0083158 | A1 * | 4/2010 | Adler et al. | 715/771 |
| 2010/0161547 | A1 * | 6/2010 | Carmel et al. | 706/59 |
| 2010/0246571 | A1 * | 9/2010 | Geppert et al. | 370/352 |
| 2010/0275128 | A1 * | 10/2010 | Ward et al. | 715/744 |
| 2010/0293560 | A1 | 11/2010 | Bland et al. | |
| 2010/0312769 | A1 | 12/2010 | Bailey et al. | |
| 2010/0318619 | A1 | 12/2010 | Meijer | |

(Continued)

FOREIGN PATENT DOCUMENTS

| KR | 10-2009-0102252 A | 9/2009 |
|---|---|---|
| KR | 10-2010-0053704 A | 9/2009 |
| KR | 10-2010-0021494 A | 2/2010 |

OTHER PUBLICATIONS

Barrett et al., Intermediaries: New Places fro Producing and Manipulating Web Content, Google 1998, pp. 509-518.*

(Continued)

*Primary Examiner* — Cong-Lac Huynh
(74) *Attorney, Agent, or Firm* — Tom Wong; Jim Ross; Micky Minhas

(57) ABSTRACT

Dynamic filtering of content in a content feed may be provided. A user interface may be displayed on a computer for presenting different views of content. The user interface may include a title bar for switching between the different views and for displaying notifications. The different views may include content generated by users of the content feed. Content in the different views may be filtered based on a type and a priority of the content during the presentation of each of the views in the user interface.

18 Claims, 8 Drawing Sheets

(56) References Cited

U.S. PATENT DOCUMENTS

| | | | |
|---|---|---|---|
| 2011/0004831 A1* | 1/2011 | Steinberg et al. | 715/753 |
| 2011/0021250 A1 | 1/2011 | Ickman et al. | |
| 2011/0047117 A1 | 2/2011 | Sinha | |
| 2011/0055723 A1 | 3/2011 | Lightstone et al. | |
| 2011/0106829 A1* | 5/2011 | Pradhan et al. | 707/765 |
| 2011/0112821 A1 | 5/2011 | Basso et al. | |
| 2011/0154223 A1* | 6/2011 | Whitnah et al. | 715/753 |
| 2011/0258154 A1* | 10/2011 | Koppula | 706/46 |
| 2011/0295827 A1* | 12/2011 | Genser | 707/706 |
| 2012/0158715 A1* | 6/2012 | Maghoul et al. | 707/728 |
| 2012/0191760 A1* | 7/2012 | Kaufman et al. | 707/802 |
| 2012/0203734 A1* | 8/2012 | Spivack et al. | 707/602 |
| 2012/0278264 A1* | 11/2012 | Deyo | 706/12 |
| 2012/0324003 A1* | 12/2012 | Armstrong et al. | 709/204 |
| 2013/0006779 A1* | 1/2013 | Belluomini | 705/14.69 |
| 2013/0014031 A1* | 1/2013 | Whitnah et al. | 715/753 |
| 2013/0111354 A1* | 5/2013 | Marra et al. | 715/751 |
| 2013/0145323 A1* | 6/2013 | Ward et al. | 715/835 |
| 2013/0159833 A1* | 6/2013 | Look et al. | 715/230 |

OTHER PUBLICATIONS

Ramage et al., Characterizing Microblogs with Topic Models, Google 2010, pp. 130-137.*

Austin et al., Social and Commercial Entrepreneurship: Same, Different, or Both, Google 2006, pp. 1-22.*

Rose et al., "Cobra: Content-based Filtering and Aggregation of Blogs and RSS Feeds," Published Apr. 11-13, 2007, Proceedings: 4$^{th}$ Use Nix Symposium on Networked System Design and Implementation, http://www.eecs.harvard.edu/~rohan/papers/cobra-nsdi07.pdf, 14 pages.

International Search Report and Written Opinion mailed Dec. 26, 2012 in Application No. PCT/US2012/051951, 8 pages.

* cited by examiner

DYNAMIC CONTENT FEED FILTERING

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

A number of websites, such as those provided by social networking services, provide blogs which enable users to provide commentary, describe events or insert other material (such as graphics or video) for viewing by other users on a website or a portion of a website. A typical blog combines text, images, and links to other blogs, Web pages, and other media related to its topic. Blogs may also include microblogs which are typically limited to very short posts. A drawback associated with current blogs (including microblogs) is that content is often presented to users on a series of different pages that all have different interfaces for interacting with content. For example, a service may be set up such that one or more pages may be required for viewing special notifications (e.g., inbox-style need-to-know information), an additional profile page may be required as an exclusive area to view a user's own activities while further additional pages may be required for viewing company-wide information and user filters on this information. It is with respect to these considerations and others that the various embodiments of the present invention have been made.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are provided for the dynamic filtering of content in a content feed. A user interface may be displayed on a computer for presenting different views of content. The user interface may include a title bar for switching between the different views and for displaying notifications. The different views may include content generated by users of the content feed. Content in the different views may be filtered based on a type and a priority of the content during the presentation of each of the views in the user interface.

These and other features and advantages will be apparent from a reading of the following detailed description and a review of the associated drawings. It is to be understood that both the foregoing general description and the following detailed description are illustrative only and are not restrictive of the invention as claimed.

This summary is provided to introduce a selection of concepts in a simplified form that are further described below in the detailed description. This summary is not intended to identify key features or essential features of the claimed subject matter, nor is it intended as an aid in determining the scope of the claimed subject matter.

DETAILED DESCRIPTION

Embodiments are provided for the dynamic filtering of content in a content feed. A user interface may be displayed on a computer for presenting different views of content. The user interface may include a title bar for switching between the different views and for displaying notifications. The different views may include content generated by users of the content feed. Content in the different views may be filtered based on a type and a priority of the content during the presentation of each of the views in the user interface.

Figure 1:
FIG. 1 is a computer screen display of a user interface which may be utilized for dynamically filtering content in a content feed, in accordance with an embodiment.

FIG. 1 is a computer screen display of a user interface 100 which may be utilized for dynamically filtering content in a content feed, in accordance with an embodiment. The user interface 100 may displayed on a Web page for a user 150. In accordance with an embodiment, the website may be provided by a desktop, server or mobile web application platform such as the SHAREPOINT and SHAREPOINT MOBILE web application platforms from MICROSOFT CORPORATION of Redmond, Wash. It should be appreciated that other web application platforms for generating websites may also be utilized in accordance with various embodiments. The user interface 100 may include an input area 105, a title bar 115 and a content feed 130 for displaying content posted by the user 150 as well as content posted by other users such as users 160, 170 and 180.

The input area 105 may comprise an area for posting content to the content feed 130 via the Post user control 110. The title bar 115 may include a user control 117 and a notification alert 120. The user control 117 may be utilized for switching between filtered views of different types of content. For example, the user control 117 may be utilized to switch from the currently displayed Following view (i.e., a view displaying one or more posts being followed by a user of the content feed) to a different view (e.g., an @Me view in which one or more posts are displayed that mention a user of the content feed) in the user interface 100 without having to reload the Web page for the user 150. The notification alert 120 is utilized to alert a user of new content which may be seen by switching to a different view. For example, the notification alert 120 displays "4@Me" which indicates that four new posts have been received in a @Me view which is accessible for viewing in the user interface 100 via a selection of the user control 117.

In accordance with various embodiments, the content feed 130 may comprise a content feed, blog feed or microblog feed which is utilized by the user interface 100 for presenting distinct kinds of information to a user including information about others, need-to-know information about the user and a record of the user's activities and bookmarks, in a unified manner. For example, the content feed 130 may include text posted by users, a posted website link 135 and a glyph 140 indicating that one or more users likes a posted comment (e.g., text or link). The content feed 130 may also be filtered to only show specific content. For example, the content feed 130 (as indicated by the title bar 115) shows a Following view which only shows posts that are being followed by Armando (i.e., the user 150 of the content feed 130).

Figure 2:
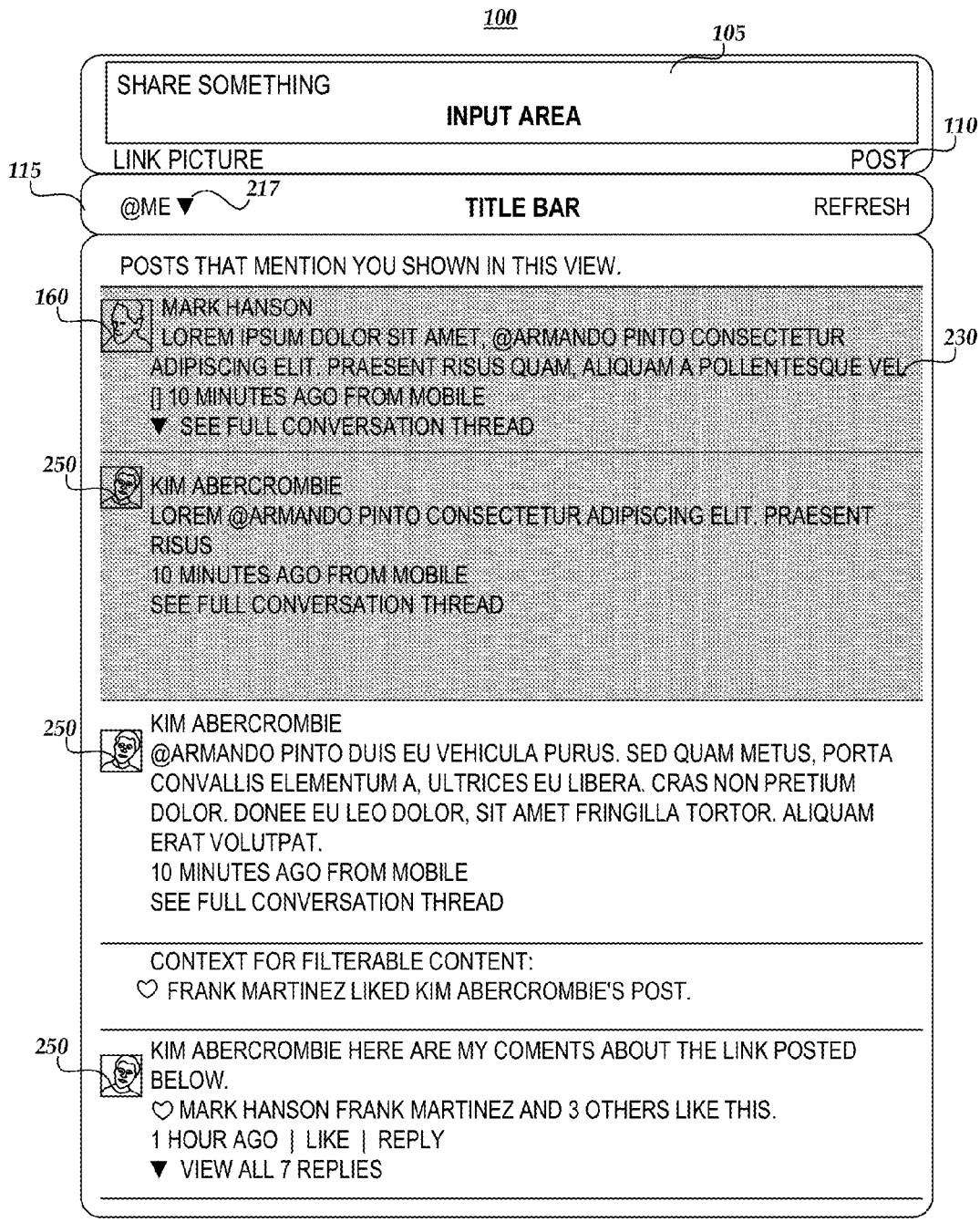
FIG. 2 is a computer screen display of a user interface which may be utilized for dynamically filtering content in a content feed, in accordance with another embodiment.

FIG. 2 is a computer screen display of the user interface 100 which may be utilized for dynamically filtering content in a content feed, in accordance with another embodiment. As discussed above with respect to FIG. 1, the user interface 100 may be displayed on a Web page for the user 150. The user interface 100 may include the input area 105, the title bar 115 and a content feed 230 for displaying content posted about the user 150 by other users such the user 160 as well as a user 250. The input area 105 may comprise an area for posting content to the content feed 230 via the Post user control 110. The title bar 115 may include a user control 217 for selecting views for viewing filtered content in the content feed 230. In accordance with an embodiment, the content feed 230 may be displayed in the user interface 100 in response to a user selecting the @Me view from a previously presented Following view. As briefly discussed above with respect to FIG. 1, the content feed 230 for the @Me view may be filtered to only show posts that mention a specific user of a content feed. For example, the content feed 230 only shows posts that are about the user Armando (i.e., the user 150 in FIG. 1). In addition, the content feed 230 may include highlighting (e.g., shading) for newly posted content. The highlighting may be utilized to distinguish the newly posted content from older content in the content feed 230.

Figure 3:
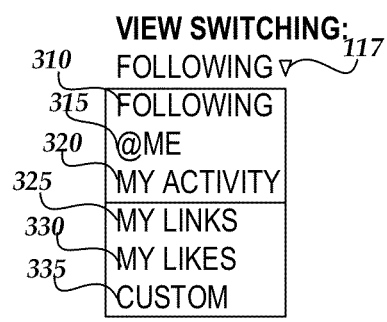
FIG. 3 is a computer screen display of a user control for switching between views in the user interface of FIG. 1 or 2, in accordance with an embodiment.

FIG. 3 is a computer screen display of a drop-down list 300 for switching between views in the user interface of FIG. 1 or 2, in accordance with an embodiment. In accordance with an embodiment, the drop-down list 300 may comprise a user control which may be initiated in response to a user input received on the user control 117 (discussed above with respect to FIG. 1). The drop-down list 300 may utilized to select among a number of different views for displaying filtered content in a content feed. In accordance with an embodiment, the selectable views may include, but are not limited to, Following view 310, @Me view 315, My Activity view 320, My Links view 325, My Likes view 330 and Custom view 335. In accordance with an embodiment, the Following view 310 may display one or more posts being followed by a user of a content feed, the @Me view 315 may display one or more posts that mention the user of the content feed, the My Activity view 320 may display one or more posts of activities involving the user of the content feed, the My Links view 325 may display one or more links posted by the user of the content feed, and the My Likes view may display one or more posts identified as being liked by the user of the content feed. The Custom view 335 may be configured by a user to provide a customized display of filtered content in a content feed. As a non-limiting example, the Custom view 335 may be configured as a My Favorite People view which only displays posts of users whom the user of the content feed is fond of As another non-limiting example, the Custom view 335 may be configured in a workplace setting to only display posts from members of the user's workgroup (e.g., My Workgroup). As still another non-limiting example the Custom view 335 may be configured to only display posts from members of a team (e.g., a sports or gaming team) which the user is a part of or associated with (e.g., My Team). It should be understood that, in accordance with embodiments, other Custom views may also be configured instead of or in addition to the aforementioned views.

Figure 4:
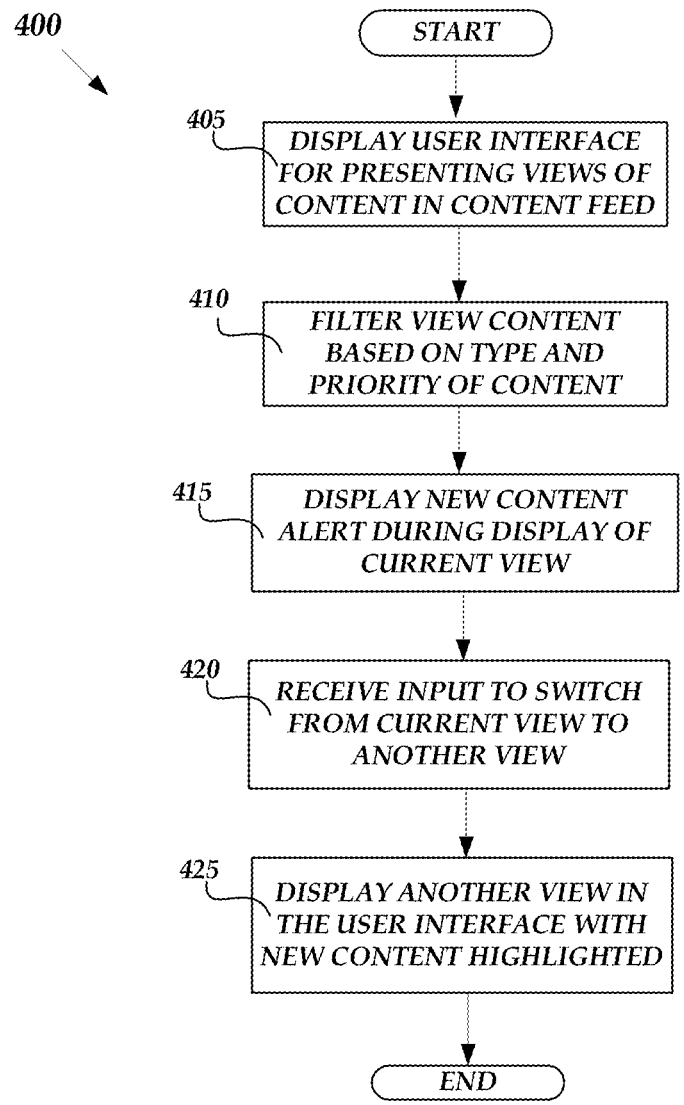
FIG. 4 is a flow diagram illustrating a routine dynamically filtering content in a content feed, in accordance with an embodiment.

FIG. 4 is a flow diagram illustrating a routine 400 for dynamically filtering content in a content feed, in accordance with an embodiment. When reading the discussion of the routine presented herein, it should be appreciated that the logical operations of various embodiments of the present invention are implemented (1) as a sequence of computer implemented acts or program modules running on a computing system and/or (2) as interconnected machine logical circuits or circuit modules within the computing system. The implementation is a matter of choice dependent on the performance requirements of the computing system implementing the invention. Accordingly, the logical operations illustrated in FIG. 4 and making up the various embodiments described herein are referred to variously as operations, structural devices, acts or modules. It will be recognized by one skilled in the art that these operations, structural devices, acts and modules may be implemented in software, in firmware, in special purpose digital logical, and any combination thereof without deviating from the spirit and scope of the present invention as recited within the claims set forth herein.

The routine 400 begins at operation 405, where a computing device may be utilized to execute an application for displaying a user interface for presenting views of content in a content feed. As discussed above with respect to FIG. 1, the content feed may comprise, for example, a microblog feed and the user interface may comprise a title bar for switching between various views (via selection of a user control) of a content feed and for displaying notifications. Each of the views of the content feed may include content generated by users of the content feed. In accordance with an embodiment, the application may be configured to display a default view of posts that a user is following in the content feed (i.e., a Following view) upon the initiation of the user interface by the application executing on the computing device. A view which is currently being displayed in the user interface may also be known as a current view. As discussed above with respect to FIGS. 1-2, a current view of a content feed which is displayed in the user interface may further include the display of glyphs and/or text to distinguish among different types of filterable content. The various views may include, without limitation, a Following view, a @Me view, an Activity view, a Links view, a Likes view and a Custom view.

From operation 405, the routine 400 continues to operation 410, where the application executing on the computing device may filter the content in a view based on a type and priority of the content to be displayed in the content feed for that view. In accordance with an embodiment, the application may filter the content for each view during the presentation of a view in the user interface. Thus, content may be filtered based on one or more posts being followed by a user of the content feed, one or more posts that mention the user of the content feed, one or more posts of activities involving the user of the content feed, one or more links posted by the user of the content feed, and one or more posts identified as being liked by the user of the content feed. For example, if upon initiation of the user interface, the application is configured to display the Following view, the application may filter out unrelated content (i.e., posts) so that only posts which are being followed by a user of the content feed are displayed in the user interface. As another example, the filtering of content may also include sorting posts in the content feed in a chronological order or sorting posts in the content feed based on posted content which has recently been changed in the content feed. For example, posts in the My Activity view may be sorted in chronological order based on the completion of a list of activities while posts in the My Following view may be sorted by the most recently changed content (i.e., newly posted content) in the content feed.

From operation 410, the routine 400 continues to operation 415, where the application executing on the computing device may display a new content alert during the display of a current view in the user interface. In particular the new content alert may be displayed in a title bar of the user interface and may comprise an alert for at least one other (i.e., different) view. For example, as discussed above, FIG. 1 shows a user interface 100 for a Following view in which the title bar 115 includes the notification alert 120 for the @Me view. In particular, the notification alert 120 displays "4@Me" which indicates that four new posts have been received in the @Me view which is accessible for viewing in the user interface 100 via a selection of the user control 117.

From operation 415, the routine 400 continues to operation 420, where the application executing on the computing device may receive, in the user interface, an input in the title bar to switch from the current view to another view. For example, as shown in FIG. 3, the user interface may include a drop-down list 300 for selecting among a number of different views for displaying filtered content in a content feed.

From operation 420, the routine 400 continues to operation 425, where the application executing on the computing device may display another view in the user interface with new content highlighted in the user interface. For example, as shown in FIG. 2, the user interface 100 may comprise the @Me view in which newly posted content in the content feed 230 is highlighted. From operation 425, the routine 400 then ends.

Figure 5:
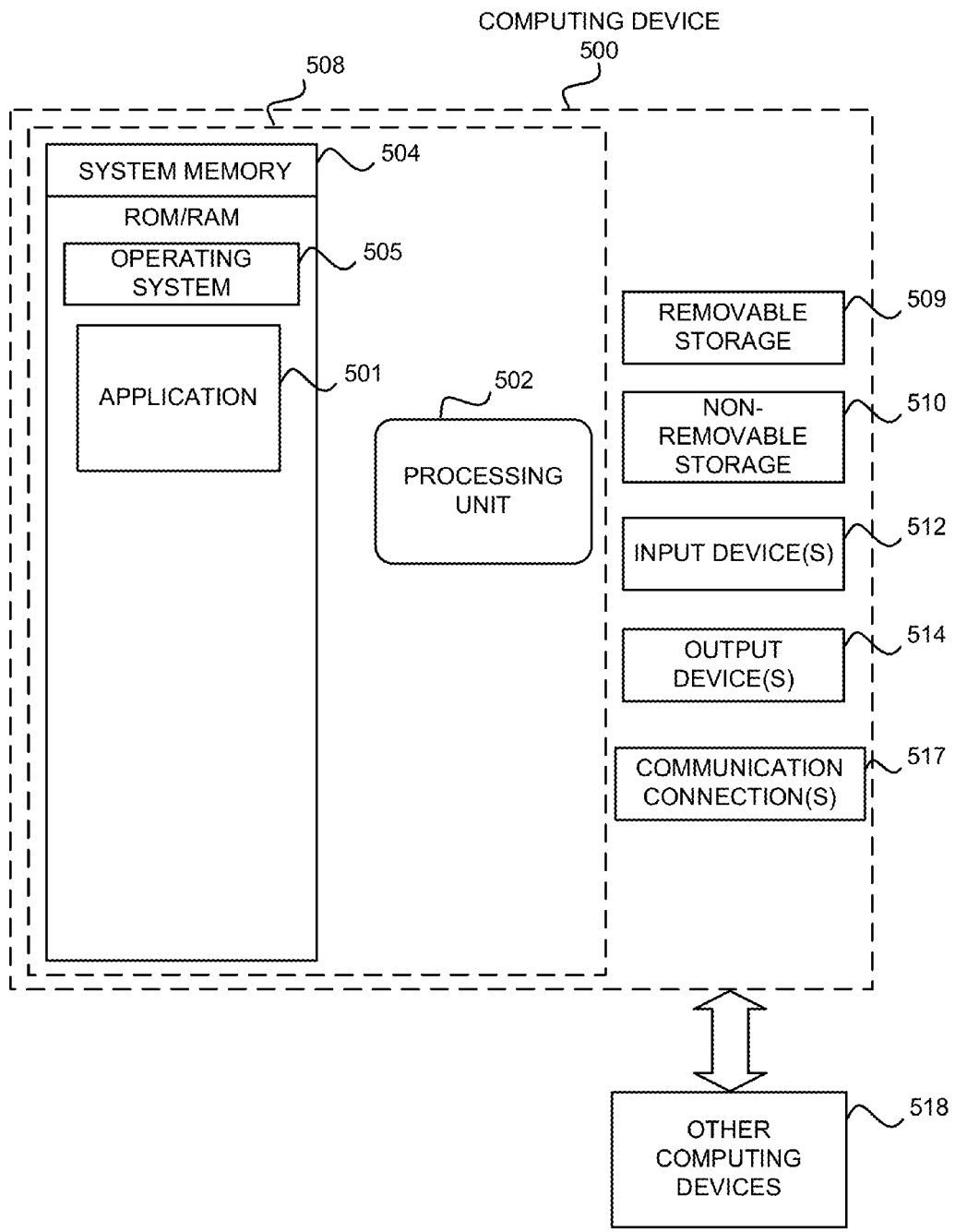
FIG. 5 is a simplified block diagram of a computing device with which various embodiments may be practiced.

FIG. 5 is a block diagram illustrating example physical components of a computing device 500 with which various embodiments may be practiced. The computing device components described below may be suitable for the computing device described above with respect to FIG. 4. In a basic configuration, the computing device 500 may include at least one processing unit 502 and a system memory 504. Depending on the configuration and type of computing device, system memory 504 may comprise, but is not limited to, volatile (e.g. random access memory (RAM)), non-volatile (e.g. read-only memory (ROM)), flash memory, or any combination. System memory 504 may include an operating system 505 and an application 501. Operating system 505, for example, may be suitable for controlling computing device 500's operation and, in accordance with an embodiment, may comprise the WINDOWS operating systems from MICROSOFT CORPORATION of Redmond, Wash. The application 501 may comprise the SHAREPOINT or the SHAREPOINT MOBILE web application platforms, both of which are from MICROSOFT CORPORATION of Redmond, Wash. It should be understood, however, that other web application platforms from other manufacturers may be utilized in accordance with the various embodiments described herein. It should be understood that the embodiments described herein may also be practiced in conjunction with other operating systems and application programs and further, is not limited to any particular application or system.

The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by a removable storage 509 and a non-removable storage 510.

While executing on the processing unit 502 of the computing device 500, the application 501 may perform a routine for dynamically filtering content in a content feed, including, for example, one or more of the operations in routine 400 described above. The aforementioned routines are examples, and the processing unit 502 may perform other routines. Generally, consistent with various embodiments, program modules may be provided which include routines, programs, components, data structures, and other types of structures that may perform particular tasks or that may implement particular abstract data types. Moreover, various embodiments may be practiced with other computer system configurations, including hand-held devices, multiprocessor systems, microprocessor-based or programmable consumer electronics, minicomputers, mainframe computers, and the like. Various embodiments may also be practiced in distributed computing environments where tasks are performed by remote processing devices that are linked through a communications network. In a distributed computing environment, program modules may be located in both local and remote memory storage devices.

Furthermore, various embodiments may be practiced in an electrical circuit comprising discrete electronic elements, packaged or integrated electronic chips containing logic gates, a circuit utilizing a microprocessor, or on a single chip containing electronic elements or microprocessors. For example, various embodiments may be practiced via a system-on-a-chip ("SOC") where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the application 501 may operate via application-specific logic integrated with other components of the computing device/system 500 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Various embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process.

The term computer readable media as used herein may include computer storage media. Computer storage media may include volatile and nonvolatile, removable and non-removable media implemented in any method or technology for storage of information, such as computer readable instructions, data structures, program modules, or other data. The system memory 504, removable storage 509, and non-removable storage 510 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by the computing device 500. Any such computer storage media may be part of the computing device 500. The computing device 500 may also have input device(s) 512 such as a keyboard, a mouse, a pen, a sound input device, a touch input device, etc. Output device(s) 514 such as a display, speakers, a printer, etc. may also be included. The aforementioned devices are examples and others may be used.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 6A:
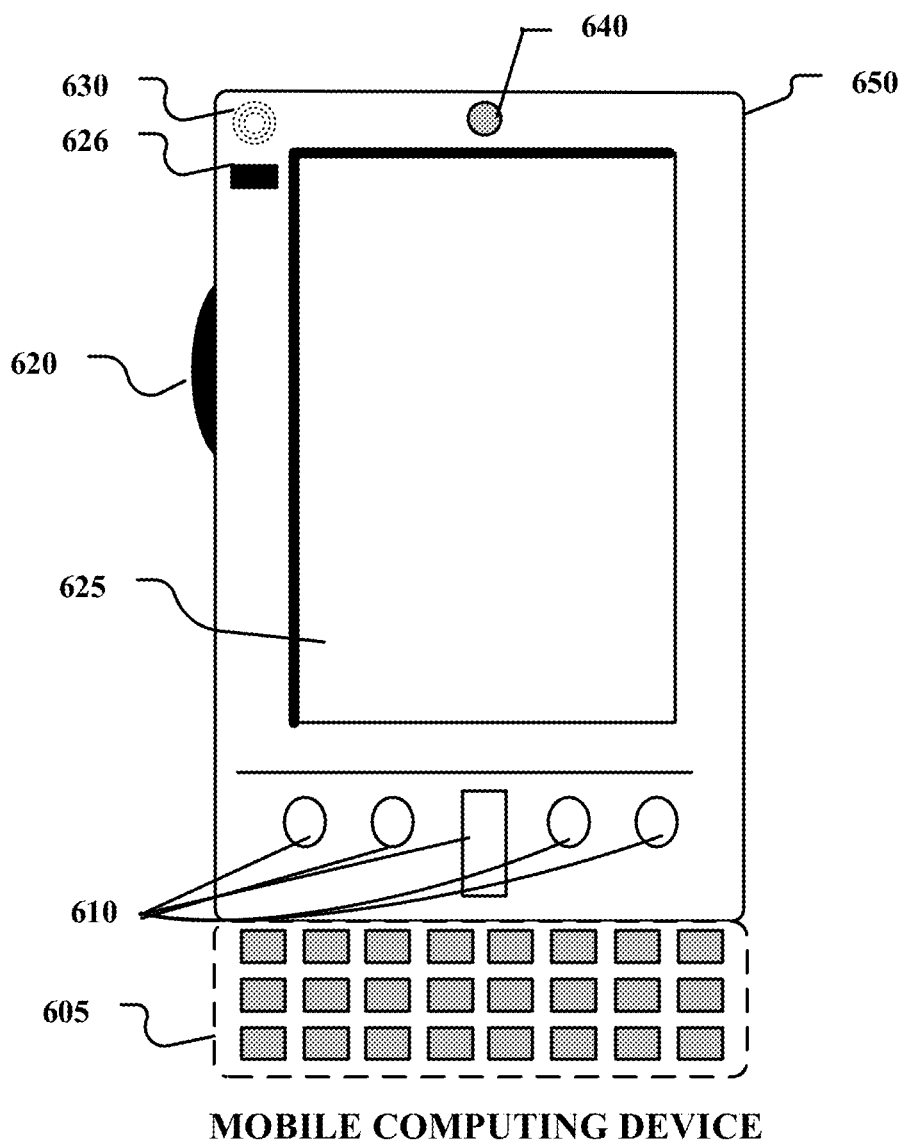
FIG. 6A is a simplified block diagram of a mobile computing device with which various embodiments may be practiced.
Figure 6B:
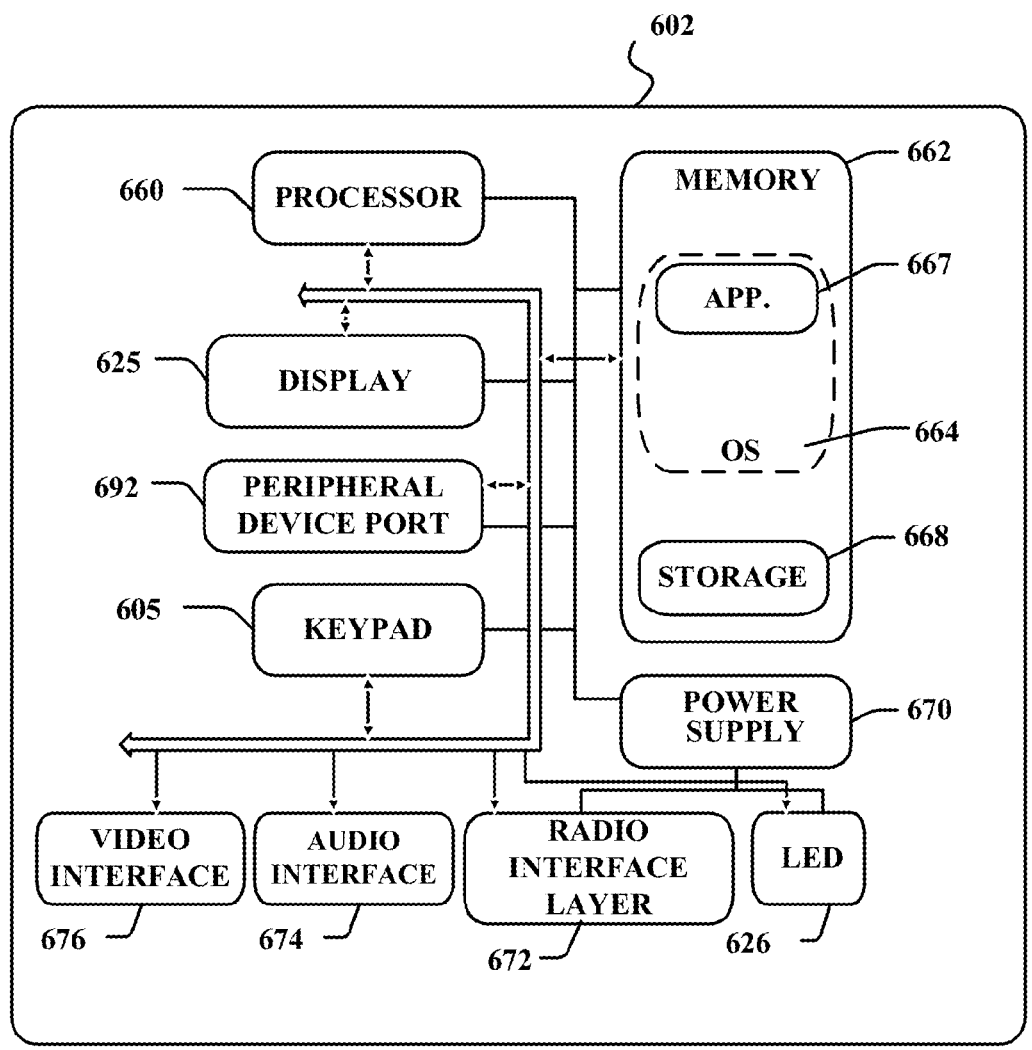
FIG. 6B is a simplified block diagram of a mobile computing device with which various embodiments may be practiced.

FIGS. 6A and 6B illustrate a suitable mobile computing environment, for example, a mobile telephone 650, a smartphone, a tablet personal computer, a laptop computer, and the like, with which various embodiments may be practiced. With reference to FIG. 6A, an example mobile computing device 650 for implementing the embodiments is illustrated. In a basic configuration, mobile computing device 650 is a handheld computer having both input elements and output elements. Input elements may include touch screen display 625 and input buttons 610 that allow the user to enter information into mobile computing device 650. Mobile computing device 650 may also incorporate an optional side input element 620 allowing further user input. Optional side input element 620 may be a rotary switch, a button, or any other type of manual input element. In alternative embodiments, mobile computing device 650 may incorporate more or less input elements. For example, display 625 may not be a touch screen in some embodiments. In yet another alternative embodiment, the mobile computing device is a portable phone system, such as a cellular phone having display 625 and input buttons 610. Mobile computing device 650 may also include an optional keypad 605. Optional keypad 605 may be a physical keypad or a "soft" keypad generated on the touch screen display.

Mobile computing device 650 incorporates output elements, such as display 625, which can display a graphical user interface (GUI). Other output elements include speaker 630 and LED light 626. Additionally, mobile computing device 650 may incorporate a vibration module (not shown), which causes mobile computing device 650 to vibrate to notify the user of an event. In yet another embodiment, mobile computing device 650 may incorporate a headphone jack (not shown) for providing another means of providing output signals.

Although described herein in combination with mobile computing device 650, in alternative embodiments may be used in combination with any number of computer systems, such as in desktop environments, laptop or notebook computer systems, multiprocessor systems, micro-processor based or programmable consumer electronics, network PCs, mini computers, main frame computers and the like. Various embodiments may also be practiced in distributed computing environments where tasks are performed by remote processing devices that are linked through a communications network in a distributed computing environment; programs may be located in both local and remote memory storage devices. To summarize, any computer system having a plurality of environment sensors, a plurality of output elements to provide notifications to a user and a plurality of notification event types may incorporate the various embodiments described herein.

FIG. 6B is a block diagram illustrating components of a mobile computing device used in one embodiment, such as the computing device shown in FIG. 6A. That is, mobile computing device 650 can incorporate a system 602 to implement some embodiments. For example, system 602 can be used in implementing a "smart phone" that can run one or more applications similar to those of a desktop or notebook computer such as, for example, the application discussed above with respect to FIG. 4 as well as other applications. In some embodiments, the system 602 is integrated as a computing device, such as an integrated personal digital assistant (PDA) and wireless phone.

An application 667 may be loaded into memory 662 and run on or in association with an operating system 664. The application 667 may be perform a routine for dynamically filtering content in a content feed including, for example, one or more of the operations in routine 400 described above. The system 602 also includes keypad 605 and display 625. The system 602 also includes non-volatile storage 668 within memory the 662. Non-volatile storage 668 may be used to store persistent information that should not be lost if system 602 is powered down. The application 667 may use and store information in the non-volatile storage 668. A synchronization application (not shown) also resides on system 602 and is programmed to interact with a corresponding synchronization application resident on a host computer to keep the information stored in the non-volatile storage 668 synchronized with corresponding information stored at the host computer. As should be appreciated, other applications may also be loaded into the memory 662 and run on the device 650.

The system 602 has a power supply 670, which may be implemented as one or more batteries. The power supply 670 might further include an external power source, such as an AC adapter or a powered docking cradle that supplements or recharges the batteries.

The system 602 may also include a radio 672 that performs the function of transmitting and receiving radio frequency communications. The radio 672 facilitates wireless connectivity between the system 602 and the "outside world," via a communications carrier or service provider. Transmissions to and from the radio 672 are conducted under control of OS 664. In other words, communications received by the radio 672 may be disseminated to the application 667 via OS 664, and vice versa.

The radio 672 allows the system 602 to communicate with other computing devices, such as over a network. The radio 672 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

The embodiment of the system 602 is shown with two types of notification output devices: LED 626 that can be used to provide visual notifications and an audio interface 674 that can be used with speaker 630 to provide audio notifications. These devices may be directly coupled to the power supply 670 so that when activated, they remain on for a duration dictated by the notification mechanism even though processor 660 and other components might shut down for conserving battery power. The LED 626 may be programmed to remain on indefinitely until the user takes action to indicate the powered-on status of the device. The audio interface 674 is used to provide audible signals to and receive audible signals from the user. For example, in addition to being coupled to speaker 630, the audio interface 674 may also be coupled to a microphone (not shown) to receive audible input, such as to facilitate a telephone conversation. In accordance with embodiments of the present invention, the microphone may also serve as an audio sensor to facilitate control of notifications. The system 602 may further include a video interface 676 that enables an operation of on-board camera 640 (see FIG. 6A) to record still images, video stream, and the like.

A mobile computing device implementing the system 602 may have additional features or functionality. For example, the device may also include additional data storage devices (removable and/or non-removable) such as, magnetic disks, optical disks, or tape. Such additional storage is illustrated in FIG. 6B by storage 668. Computer storage media may include volatile and nonvolatile, removable and non-removable media implemented in any method or technology for storage of information, such as computer readable instructions, data structures, program modules, or other data.

Data/information generated or captured by the device 650 and stored via the system 602 may be stored locally on the device 650, as described above, or the data may be stored on any number of storage media that may be accessed by the device via the radio 672 or via a wired connection between the device 650 and a separate computing device associated with the device 650, for example, a server computer in a distributed computing network such as the Internet. As should be appreciated such data/information may be accessed via the device 650 via the radio 672 or via a distributed computing network. Similarly, such data/information may be readily transferred between computing devices for storage and use according to well-known data/information transfer and storage means, including electronic mail and collaborative data/information sharing systems.

Figure 7:
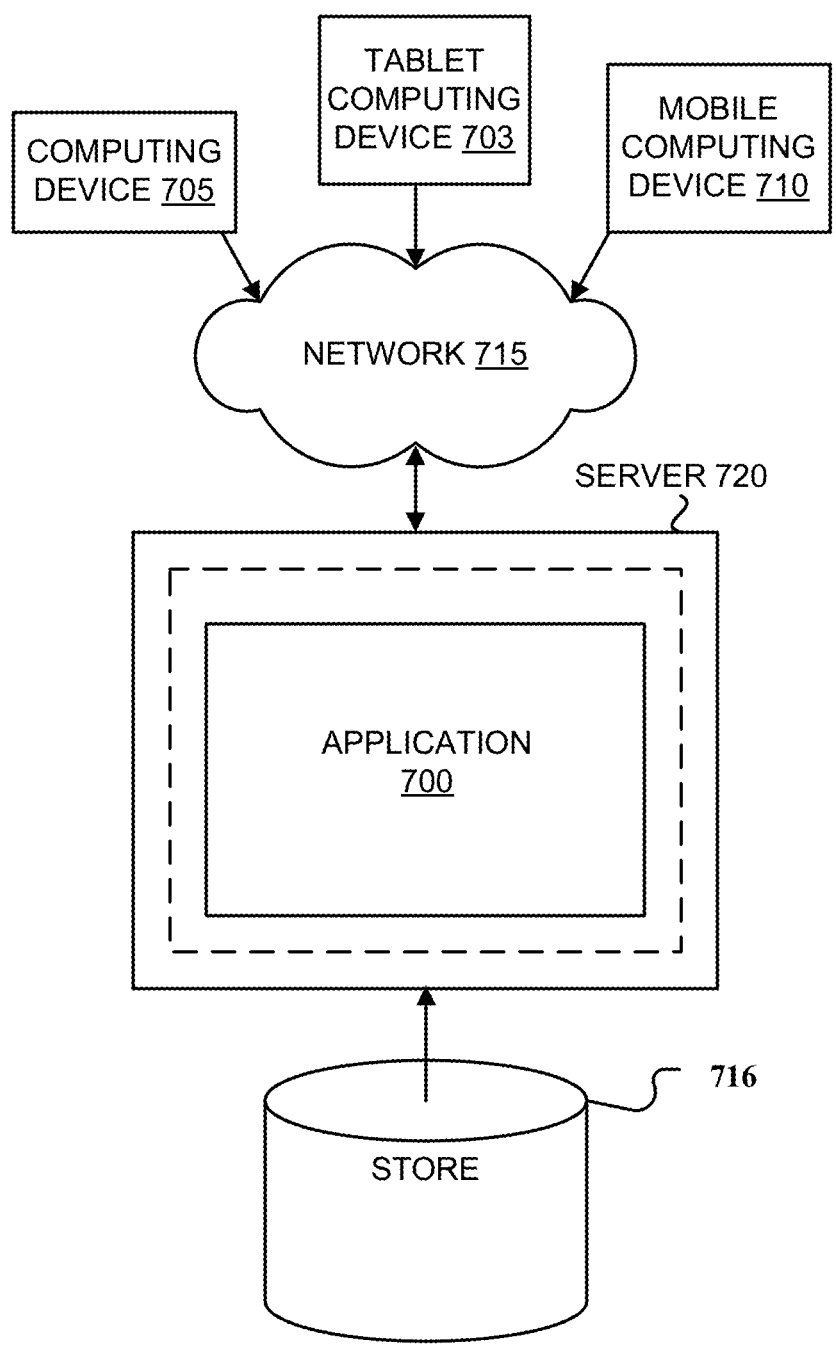
FIG. 7 is a simplified block diagram of a distributed computing system in which various embodiments may be practiced.

FIG. 7 is a simplified block diagram of a distributed computing system in which various embodiments may be practiced. The distributed computing system may include number of client devices such as a computing device 705, a tablet computing device 703 and a mobile computing device 710. The client devices 705, 703 and 710 may be in communication with a distributed computing network 715 (e.g., the Internet). A server 720 is in communication with the client devices 705, 703 and 710 over the network 715. The server 720 may store application 700 which may be perform a routine for dynamically filtering content in a content feed including, for example, one or more of the operations in routine 400 described above.

Various embodiments are described above with reference to block diagrams and/or operational illustrations of methods, systems, and computer program products according to embodiments of the invention. The functions/acts noted in the blocks may occur out of the order as shown in any flow diagram. For example, two blocks shown in succession may in fact be executed substantially concurrently or the blocks may sometimes be executed in the reverse order, depending upon the functionality/acts involved.

While certain embodiments have been described, other embodiments may exist. Furthermore, although various embodiments have been described as being associated with data stored in memory and other storage mediums, data can also be stored on or read from other types of computer-readable media, such as secondary storage devices (i.e., hard disks, floppy disks, or a CD-ROM), a carrier wave from the Internet, or other forms of RAM or ROM. Further, the disclosed routines' operations may be modified in any manner, including by reordering operations and/or inserting or operations, without departing from the invention.

It will be apparent to those skilled in the art that various modifications or variations may be made without departing from the scope or spirit of the invention. Other embodiments will be apparent to those skilled in the art from consideration of the specification and practice of the invention disclosed herein.

What is claimed is:

1. A computer-implemented method for dynamically filtering content in a content feed, comprising:
   displaying, by a computer, a user interface for presenting a plurality of views, the user interface comprising a title bar for switching between the plurality of views and for displaying notifications, the title bar displaying a single view name adjacent to a user control for selecting a plurality of currently hidden views, the title bar further displaying at least one of the notifications in the user interface, wherein at least one of the notifications is related to one of the plurality of currently hidden views to alert a user of a new content which can be seen when switching to a view of the at least one of the notifications, the plurality of views comprising content generated by users of the content feed; and
   filtering, by the computer, the content in each of the plurality of views based on a type and priority of the content during the presentation of each of the plurality of views in the user interface.

2. The method of claim 1, wherein displaying, by a computer, a user interface for presenting a plurality of views, the plurality of views comprising content generated by users of the content feed, comprises displaying a current view in the user interface.

3. The method of claim 2, wherein displaying a current view in the user interface comprises displaying a default view comprising a plurality of posts that a user is following in the content feed upon initiation of the user interface.

4. The method of claim 2, wherein displaying a current view in the user interface comprises displaying at least one of glyphs and text to distinguish among different types of filterable content displayed in the current view.

5. The method of claim 2, further comprising:
   receiving an input in the title bar to switch from the current view to another view in the plurality of views; and
   displaying the another view in the user interface, wherein new content in the another view is highlighted in the user interface.

6. The method of claim 1, displaying, by a computer, a user interface for presenting a plurality of views, the plurality of views comprising content generated by users of the content feed comprises displaying one or more of the following: a Following view, a @Me view, an Activity view, a Links view, a Likes view and a Custom view.

7. The method of claim 1, wherein filtering, by the computer, the content in each of the plurality of views based on a type and a priority of the content during the presentation of each of the plurality of views in the user interface comprises filtering the content based on one or more of the following: one or more posts being followed by a user of the content feed, one or more posts that mention the user of the content feed, one or more posts of activities involving the user of the content feed, one or more links posted by the user of the content feed, and one or more posts identified as being liked by the user of the content feed.

8. The method of claim 1, wherein filtering, by the computer, the content in each of the plurality of views based on a type and a priority of the content during the presentation of each of the plurality of views in the user interface comprises:
sorting posts in the content feed in a chronological order; and
sorting posts in the content feed based on posted content which has been recently changed in the content feed.

9. A computer system for dynamically filtering content in a microblog feed, comprising:
a memory for storing executable program code; and
a processor, functionally coupled to the memory, the processor being responsive to computer-executable instructions contained in the program code and operative to:
display a user interface for presenting a plurality of views, the user interface comprising a title bar for switching between the plurality of views and for displaying notifications, the title bar displaying a single view name adjacent to a user control for selecting a plurality of currently hidden views, the title bar further displaying at least one of the notifications in the user interface, wherein at least one of the notifications is related to one of the plurality of currently hidden views to alert a user of a new content which can be seen when switching to a view of the at least one of the notifications, the plurality of views comprising content generated by users of the microblog feed; and
filter the content in each of the plurality of views based on a type and a priority of the content during the presentation of each of the plurality of views in the user interface.

10. The system of claim 9, wherein the processor, in displaying a user interface for presenting a plurality of views, the plurality of views comprising content generated by users of the microblog feed, is further operative to display a current view in the user interface.

11. The system of claim 10, wherein the processor, in displaying a current view in the user interface, is further operative to display a default view comprising a plurality of posts that a user is following in the content feed upon initiation of the user interface.

12. The system of claim 10, wherein the processor, in displaying a current view in the user interface, is further operative to display at least one of glyphs and text to distinguish among different types of filterable content displayed in the current view.

13. The system of claim 10, wherein the processor is further operative to:
receive an input in the title bar to switch from the current view to another view in the plurality of views; and
display the another view in the user interface, wherein new content in the another view is highlighted in the user interface.

14. The system of claim 10, wherein the plurality of views comprises: a Following view, a @Me view, an Activity view, a Links view, a Likes view and a Custom view.

15. The system of claim 10, wherein the processor, in filtering the content in each of the plurality of views based on a type and a priority of the content during the presentation of each of the plurality of views in the user interface, is further operative to filter the content based on one or more of the following: one or more posts being followed by a user of the content feed, one or more posts that mention the user in the content feed, one or more posts of activities involving the user of the content feed, one or more links posted by the user of the microblog feed, and one or more posts identified as being liked by the user of the microblog feed.

16. The system of claim 10, wherein the processor, in filtering the content in each of the plurality of views based on a type and a priority of the content during the presentation of each of the plurality of views in the user interface, is further operative to:
sort posts in the microblog feed in a chronological order; and
sort posts in the microblog feed based on posted content which has been recently changed in the microblog feed.

17. A computer-readable storage medium comprising computer executable instructions which, when executed by a computer, will cause the computer to perform a method for dynamically filtering content in a content feed, comprising:
displaying a user interface for presenting a current view of content generated by users of the microblog feed, the user interface comprising a title bar for switching between the plurality of views and for displaying notifications, the title bar displaying a single view name adjacent to a user control for selecting a plurality of currently hidden views, the title bar further displaying at least one of the notifications in the user interface, wherein at least one of the notifications is related to one of the plurality of currently hidden views to alert a user of a new content which can be seen when switching to a view of the at least one of the notifications, the plurality of views comprising a following view, and @me view, an activity view, a links view, a like view and a custom view;
filtering the content in the current view based on a type and a priority of the content during the presentation of the current view in the user interface, wherein filtering the content based on a type of content comprising filtering the content based at least on one or more of the following: one or more posts being followed by a user of the microblog feed, one or more posts that mention the user in the content feed, one or more posts of activities involving the user of the microblog feed, one or more links posted by the user of the microblog feed, and one or more posts identified as being liked by the user of the microblog feed, and wherein filtering the content based on a priority of the content comprises at least one of:
sorting posts in the microblog feed in a chronological order
sorting posts in the microblog feed based on posted content which has been recently changed in the microblog feed;
receiving an input in the title bar to switch from the current view to another view in the plurality of views;
displaying the another view in the user interface, wherein new content in the another view is highlighted in the user interface.

18. The computer-readable storage medium of claim 17, wherein displaying a user interface for presenting a current view of content generated by users of the microblog feed comprises displaying at least one of glyphs and text to distinguish among different types of filterable content displayed in the current view.

* * * * *